(12) United States Patent
Prest

(10) Patent No.: US 11,697,462 B2
(45) Date of Patent: Jul. 11, 2023

(54) TRACK SHOE WITH WEAR RESISTANT GROUSER

(71) Applicant: Caterpillar Inc., Peoria, IL (US)

(72) Inventor: Paul Prest, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 656 days.

(21) Appl. No.: 16/751,533

(22) Filed: Jan. 24, 2020

(65) Prior Publication Data

US 2021/0229763 A1 Jul. 29, 2021

(51) Int. Cl.
*B62D 55/26* (2006.01)
*B62D 55/21* (2006.01)
*B62D 55/28* (2006.01)

(52) U.S. Cl.
CPC ............ *B62D 55/26* (2013.01); *B62D 55/21* (2013.01); *B62D 55/28* (2013.01)

(58) Field of Classification Search
CPC ......... B62D 55/26; B62D 55/28; B62D 55/21
See application file for complete search history.

(56) References Cited

U.S. PATENT DOCUMENTS

| 3,165,364 | A | | 1/1965 | Hardman et al. |
| 3,602,364 | A | * | 8/1971 | Maglio .................. E04B 1/3205 198/689.1 |
| 3,891,341 | A | | 6/1975 | Trainor et al. |
| 3,912,338 | A | * | 10/1975 | Toews .................... B62D 55/26 305/167 |
| 4,108,229 | A | | 8/1978 | Herman |
| 4,482,193 | A | | 11/1984 | Boggs et al. |
| 5,851,014 | A | | 12/1998 | Germann et al. |
| 5,897,177 | A | | 4/1999 | Bergstrom |
| 2003/0184157 | A1 | | 10/2003 | Wolleat |
| 2010/0141027 | A1 | * | 6/2010 | Fischer .................. B62D 55/28 305/191 |
| 2012/0156520 | A1 | * | 6/2012 | Meyer ...................... C21D 1/18 219/76.14 |
| 2016/0257358 | A1 | | 9/2016 | Johnson |
| 2018/0015971 | A1 | | 1/2018 | Blackburn |
| 2018/0327036 | A1 | * | 11/2018 | Dandurand ............ B62M 27/02 |

FOREIGN PATENT DOCUMENTS

| CA | 2338609 A1 | * | 8/2002 | ............ B62D 55/26 |
| CA | 2743574 | | 1/2017 | |
| CA | 107614364 | | 1/2018 | |
| DE | 9006183 | | 9/1991 | |
| EP | 2778028 A2 | * | 9/2014 | ............ B61L 15/02 |
| WO | WO-2008155423 A1 | * | 12/2008 | ............ B62D 55/26 |
| WO | WO-2019109138 A1 | * | 6/2019 | ............... C21D 5/04 |

* cited by examiner

*Primary Examiner* — Jason R Bellinger
*Assistant Examiner* — Emily G. Castonguay

(57) ABSTRACT

A track shoe assembly includes a pad portion, and a grouser that extends from the pad portion along a direction that is perpendicular to the pad portion, terminating at a free end. A first cap is attached to the grouser, at least partially covering the free end of the grouser. The cap comprises a wear resistant material such as a white iron material or a carbide material.

20 Claims, 6 Drawing Sheets

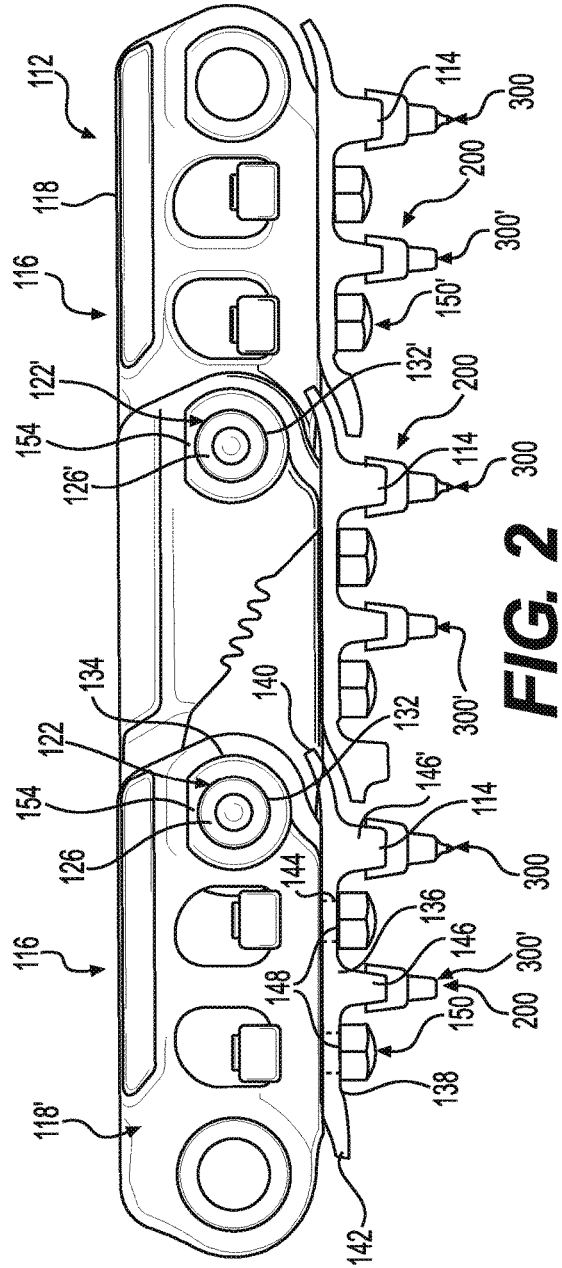

TRACK SHOE WITH WEAR RESISTANT GROUSER

TECHNICAL FIELD

The present disclosure relates to a method and apparatus for a track shoe with a grouser used to provide support and traction for a track chain assembly of an endless undercarriage drive employed by earth moving, construction and mining equipment and the like. Specifically, the present disclosure relates to such a track shoe that is wear resistant in oil sand, or other abrasive environments.

BACKGROUND

Earth moving, construction and mining equipment and the like are often used in rough, off-road terrain. These machines often employ an endless drive with track shoes that is better able to propel the machines in such environments over obstacles and uneven terrain, etc. The track chains, which include shoes, are held together by a series of interconnected track links, pins and bushings that are supported on the drive sprocket, idler and support rollers of the machine.

Also, depending on the weight of the machine, the size of the chain, the environment in which the machine operates, and other factors, the chains and/or track shoes may wear or be damaged and may require periodic inspection, servicing, repair, and/or replacement. Hence, a plurality of track shoes may be provided that may be replaced as needed by detaching and attaching the track shoes to the chain via fasteners or the like. However, frequent replacement of the track shoes may result in an unwanted increase in costs for the track shoe and the downtime of the machine.

U.S. Pat. No. 3,165,364 discloses a smooth-riding endless track having traction cleat elements that are self-cleaning during tracked vehicle operation. The cleat element may also form an interrupted wheel guide member along the length of the track, while at the same time, forming a channel to receive, in engagement with elements thereof, the idler wheels of a sprocket drive assembly for the track. Also, the cleat element may establish the center portion of the track below the marginal side portions thereof, thus concentrating wear on a replaceable central wear pad while also elevating the side portions of the track out of normal contact with hard, clear road and ground surfaces, thus increasing track cleat element longevity.

As can be seen, the '364 patent does not address the reduction of wear of a track shoe in an oil sand, or other abrasive environment. Thus, a track shoe that is less prone to wear in such abrasive environments is still needed.

SUMMARY

A cladding member that is configured to be attached to the grouser of a track shoe according to an embodiment of the present disclosure is provided. The cladding member may comprise a U-shaped body portion including a first side wall, a second side wall, and a top wall connecting the first side wall to the second side wall and spacing the first side wall away from the second side wall along a direction that is parallel to the top wall a predetermined distance. The U-shaped body portion may define an overall height measured along a direction that is perpendicular to the top wall, and an overall width that is measured along a direction that is parallel to the top wall. The U-shaped body may have a hardness that ranges from 55 HRC to 63 HRC.

A track shoe assembly according to an embodiment of the present disclosure is provided. The track shoe assembly may comprise a pad portion, a grouser that extends from the pad portion along a direction that is perpendicular to the pad portion and terminating at a free end, and a first cap that is attached to the grouser, the cap at least partially covering the free end of the grouser. The cap may comprise a white iron material.

A track chain assembly according to an embodiment of the present disclosure is provided. The track chain assembly may comprise a plurality of interconnected track links, and a plurality of track shoe assemblies that are connected to the plurality of track links. Each track shoe assembly may include a grouser, and each of the plurality of track shoe assemblies may include a U-shaped wear member portion that is attached to each grouser of the track shoe assembly. The U-shaped wear member portion may include a spike or a projection that extends from the U-shaped wear member portion.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 2 is a side-view of a track chain assembly of the machine of FIG. 1 removed from the machine.

FIG. 3 is a bottom-view illustration of the track chain assembly of FIG. 2.

DETAILED DESCRIPTION

Figure 1:
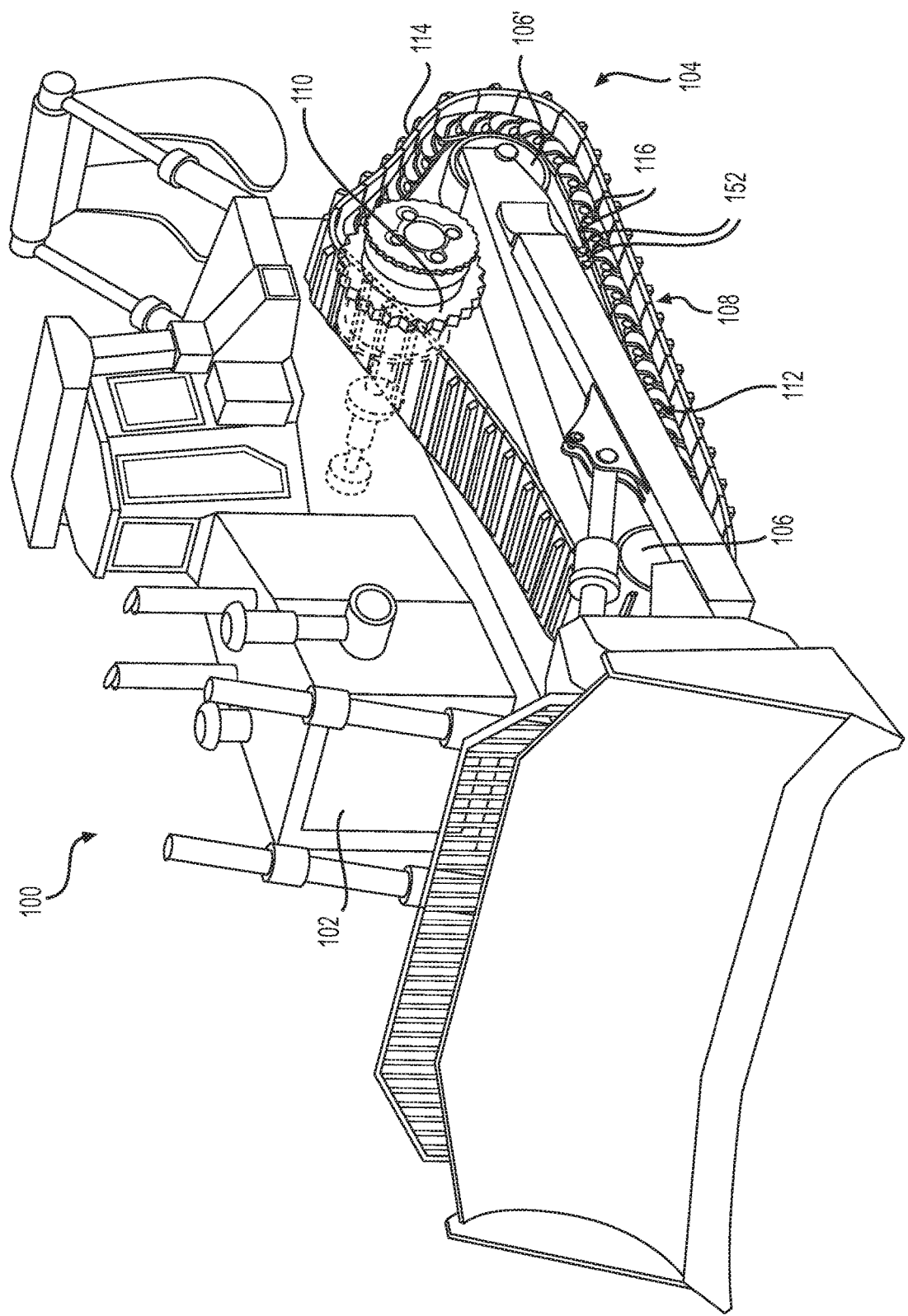
FIG. 1 is a side-view of a machine that may use various track chain assemblies with a track shoe with a cladding member attached to the grouser of the track shoe according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for creating a track chain assembly using a track shoe assembly with wear resistant members attached to the grouser of a track shoe will now be described.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106, 106'.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known or that will be devised in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a chain 112 and a plurality of track shoes 114, each configured to selectively engage a surface, e.g., the ground. Each chain 112 may include a plurality of link subassemblies 116 and the track shoes may take the form of a track shoe assembly 200 with wear resistant members attached to the grouser of the track shoe according to various embodiments of the present disclosure (not clearly shown in FIG. 1). Support rollers 152 are also provided at the bottom of the track to support the chain.

FIGS. 2 and 3 respectively illustrate side-view and bottom-view perspectives of an exemplary chain assembly 112 and, specifically, a plurality of exemplary link subassemblies 116 and track shoe assemblies 200 attached to the link subassemblies. Each one of link subassemblies 116 may include a respective pair of offset link members 118 or a respective pair of inner and outer links when straight links are used (not shown). Each offset link member 118 may include fastener holes 120, e.g., a threaded hole, configured to receive a fastener 150, e.g., a bolt, or cap screw, to attach a track shoe 114 or track shoe assembly 200 to a given one of link subassemblies 116.

Adjacent ones of link subassemblies 116 may be interconnected by way of rod assemblies 122 in the form of pins or bushings. More specifically, each rod assembly 122 may include a substantially cylindrical bushing 124 disposed about a substantially cylindrical pin 126. A pair of bearings (not shown) that are freely rotatable relative to pin 126, and a pair of seals (not shown) may also be provided in the rod assembly or in one of the link members proximate the rod assembly to prevent the loss of lubrication and provide freedom of movement.

In some embodiments, the bearings and seals may be combined functionally in the same assembly. The bushing 124 may be pressed into an aperture 128 of one end 130 of the offset link member 118 and the pin 126 may extend through this end 130 of the offset link member 118 and be received in the aperture 132 of other end 134 of the adjacent offset link member 118'. The pin 126 may be retained in the other end 134 of the adjacent offset link member 118' by being pressed into that link member 118' or be retained therein using a cotter pin or another similar device when a slip fit is being used. Other configurations and methods of assembling the link subassemblies 116 may be provided to create a track chain assembly 112. For example, a pin 126 or bushing 124 may be retained by swaging a boss 154 of a link 118, etc. Of course, a plurality of offset link members 118 are connected in a manner similar to what has just been described to form the track chain assembly 112.

More particularly, the first and second rod assemblies 122 may interface with apertures 128, 132 of adjacent offset link members 118, 118' such that consecutively connected link subassemblies 116 may be pivotally interconnected to one another to form the track chain assembly 112. For example, the outer end 134 of one offset link member 118' may mate in fixed manner with the pin 126 (such as when a press fit is employed) and house the seals and/or bearings assemblies while the inner end 130 of the adjacent offset link member 118 may mate with the bushing 124 in a fixed manner (such as when a press fit if employed). At the same time, the pin 126 may be free to rotate within the bushing 124 such as when some clearance is provided between the pin and the bore of the bushing. Consequently, a pair of adjacent offset link members 118 may be configured to pivot with respect to one another to form an articulating track chain assembly 112.

A track shoe 114 may be connected to each offset link member 118. Each track shoe 114 may include a base portion 136, a ground-engaging surface 138, a leading edge 140, and a trailing edge 142. Each track shoe 114 may also include opposing side edges 144 (only one of which shown in FIG. 2) disposed between leading edge 140 and trailing edge 142. One or more grousers or ribs 146 may be provided to engage the ground, improving traction. Additionally, each track shoe 114 may also include two pairs of threaded shoe holes 148, each pair disposed along a respective one of the side edges 144 and configured to align with a pair of fastener holes 120 associated with an offset link member 118. In some embodiments, holes 148 may be clearance holes and not be threaded.

Typically, each one of shoe holes 148 may correspond to an associated fastener receiving hole 120 situated on the bottom surface of each of the offset link members 118. As such, each track shoe 114 may respectively connect to a pair of opposing pair of offset link members 118 from one side of the track chain assembly to the other side of the track chain assembly shown in FIG. 3. Threaded fasteners 150, such as, for example, bolts or cap screws, may be respectively disposed in each one of shoe holes 148 and fastener receiving holes 120 to fasten a track shoe 114 to a respective pair of opposing offset link members 118. It is contemplated that the spacing of the fastener receiving holes 120 for each offset link member 118 may be substantially similar such that each track shoe 114 may be configured to be connectable to each of offset link members, assuming that each track shoe is also similarly or identically configured.

Looking at FIGS. 2, and 4 thru 6, it can be understood that a track chain assembly 112 according to an embodiment of the present disclosure may comprise a plurality of interconnected track links (e.g. track link subassemblies 116, offset link member 118, etc.), and a plurality of track shoe assemblies 200, 200', 200" that are connect to the plurality of track links.

Figure 4:
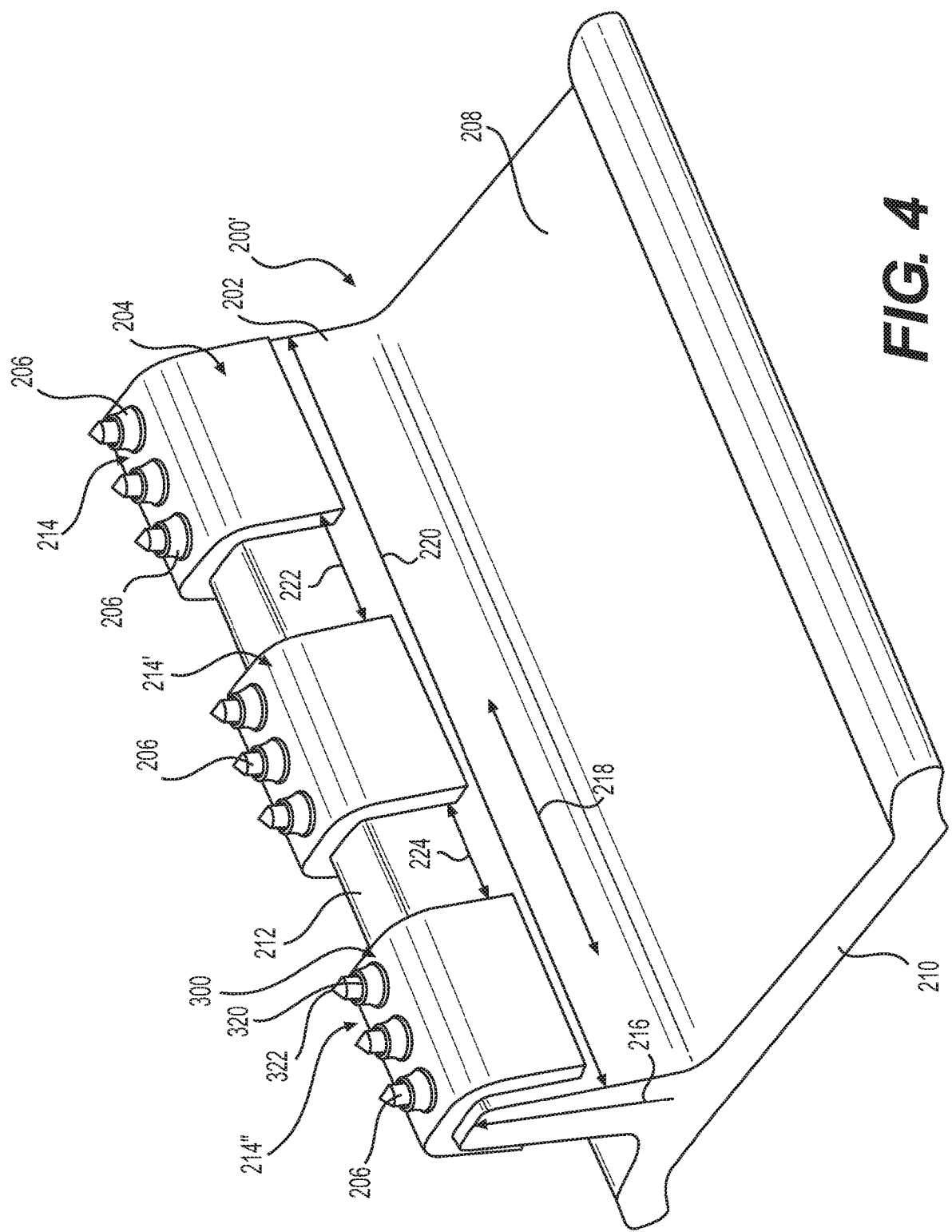
FIG. 4 is a perspective view of a track shoe with a plurality of cladding members attached to the grouser of the shoe according to an embodiment of the present disclosure that is removed from the track chain assembly.
Figure 5:
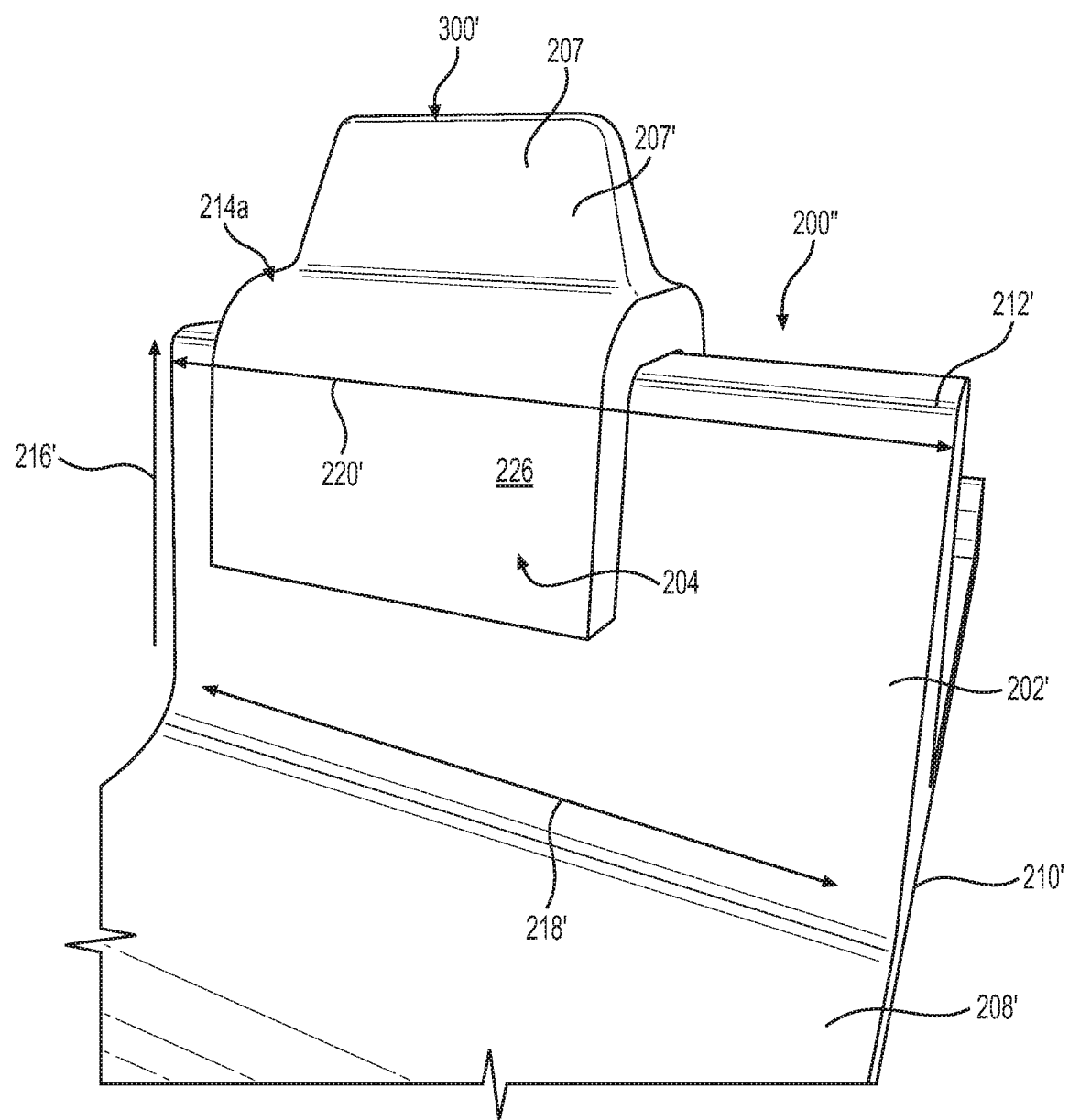
FIG. 5 is a rear oriented perspective view of another track shoe with a cladding member attached to the grouser according to another embodiment of the present disclosure.
Figure 6:
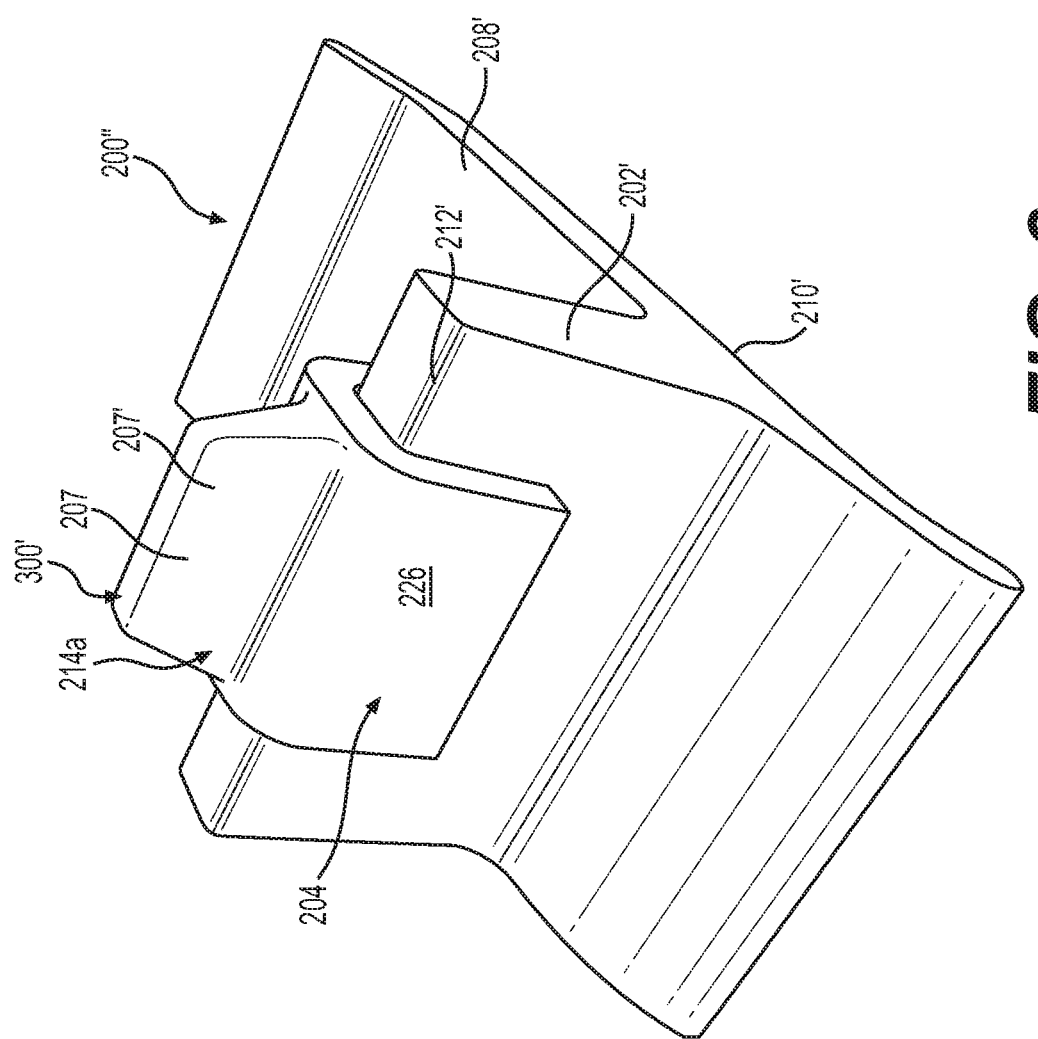
FIG. 6 is a front oriented perspective view of the track shoe of FIG. 5.

Focusing on FIGS. 4 thru 6, each track shoe assembly 200', 200" may include a track shoe 208, 208' with a grouser 202, 202', and a U-shaped wear member portion 204 may be attached to the grouser 202, 202' of the track shoe assembly 200', 200". Each of the plurality of U-shaped wear member portions 204 may include a spike 206 that extends from the U-shaped wear member portion 204 or a projection 207. The spike or projection may be omitted in other embodiments of the present disclosure, or may be exchanged for each other in various embodiments of the present disclosure.

In some embodiments, each of the plurality of U-shaped wear members 204 and each spike 206 may comprise a wear resistant material. For example, a white iron material or a carbide material may be employed, etc.

Various methods for attaching the U-shaped wear member portions to the grouser 202, 202' of the track shoe 208, 208' may be used. For example, each of the plurality of wear member portions 204 may be bonded or welded to the grouser 202, 202'. In other embodiments, only one wear member may be provided and/or other methods of attachment may be employed such as fastening, etc.

A track shoe assembly 200', 200" that may be provided as a retrofit or a replacement part in the field will now be described as follows as shown in FIGS. 4 thru 7. The track shoe assembly 200', 200' may include a pad portion 210, and a grouser 202, 202' that extends from the pad portion 210, 210' along a direction (see arrow 216, 216') that is perpendicular to the pad portion 210, 210' terminating at a free end 212 212'. A first cap 214, 214a may be attached to the grouser 202, 202', at least partially covering the free end 212, 212' of the grouser 202, 202'. The first cap 214, 214a may be manufactured using a white iron material, other wear resistant material, or hardened, coated, etc.

Also, the first cap 214, 214a may include at least partially a U-shaped profile, and may be bonded or welded to the grouser 202, 202'. Other methods of attachment may be used (e.g. fastening).

The grouser 202, 202' also extends from the pad portion 210, 210' along a direction (see arrow 218, 218') that is parallel to the pad portion 210, 210' defining a grouser length 220, 220'.

The track shoe assembly 200' may further comprising a second cap 214' that is attached to the grouser and that is spaced away from the first cap 214 a first spacing distance 222 measured along the direction 218 that is parallel to the pad portion 210, and a third cap 214" that is spaced away from the second cap 214' a second spacing distance 224 that is measured along a direction 220 that is parallel to the pad portion 210.

In some embodiments, a ratio of the grouser length 220 to the first spacing distance 222 may range from 1.0 to 10.0, and a ratio of the grouser length 220 to the second spacing distance 224 may range from 0 and have full coverage.

In such a case, the first spacing distance 222 may range from 10.0 mm to 150.0 mm, the second spacing distance may range from 250.0 mm, and the grouser length 220 may range from 500.0 mm to 1000.0 mm.

As can be seen in FIG. 4, the first spacing distance 222 may equal the second spacing distance 224. Also, the first cap 214, the second cap 214' and the third cap 214" may have identical configurations, but not necessarily so. As also shown, the first cap 214 and the third cap 214" may be disposed proximate the axial extents of the grouser 202 while the second cap 214' is centered along the grouser length 220.

Optionally, a spike 206 may extend away from any of the caps and the grouser 202 along a direction 218 that is perpendicular to the pad portion 210.

Similarly as shown in FIGS. 5 and 6, an elongated projection 207' that is integral with the U-shaped profile,
yielding a Y-shaped body 226 may be provided in some embodiments. In such a case, the first cap 214a may cover at least half of the grouser length 220'.

Any of these features may be differently configured as well as the dimensions and ratios in other embodiments of the present disclosure.

Next, a cladding member 300, 300' according to another embodiment of the present disclosure will be discussed referring to FIGS. 4 thru 7. The cladding member 300, 300' may be configured to be attached to the grouser 202 of a track shoe 208 and may be provided as a replacement part or a retrofit in the field.

Figure 7:
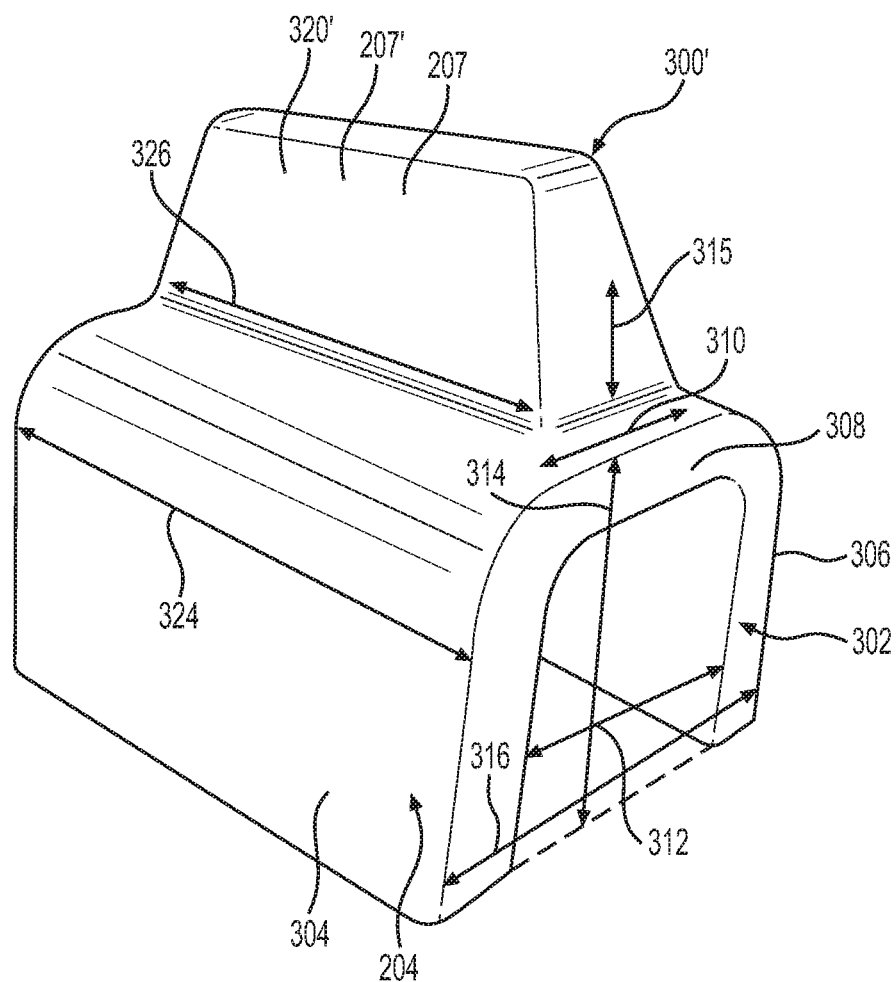
FIG. 7 is a perspective view of the cladding member of FIGS. 5 and 6 shown in isolation.

As best seen in FIG. 7, the cladding member 300' may comprise a U-shaped body portion 302 (it is to be understood that the cladding member 300 in FIG. 4 may have the same U-shaped body portion as the cladding member 300' in FIG. 7) including a first side wall 304, a second side wall 306, and a top wall 308 that connects the first side wall 304 to the second side wall 306, spacing the first side wall 304 away from the second side wall 306 along a direction (see arrow 310) that is parallel (i.e. generally parallel such that they form an angle such as a draft angle that is 20 degrees or less with respect to each other) to the top wall 308 a predetermined distance 312. Other shapes may be used such as round, oval, square or rectangular with a large radius on each corner, etc.

Furthermore, the U-shaped body portion 302 may define an overall height 314 measured along a direction 315 that is perpendicular to the top wall 308, and an overall width 316 that is measured along a direction 310 that is parallel to the top wall 308.

In such a case, a ratio of the overall width 316 to the predetermined distance 312 may be greater than 1.0, while a ratio of the overall height 314 to the overall width 316 may range from 0.5 to 1.5. Moreover, the overall height 314 may range from 30.0 mm to 50.0 mm, the overall width 316 may range from 40.0 mm to 60.0 mm, and the predetermined distance 312 may range from 30.0 mm to 50.0 mm.

Similarly, the U-shaped body portion 302 may further define an overall length 324 that is measured along a direction that is perpendicular to the overall height 314 and the overall width 316. A ratio of the overall length 324 to the overall height 314 may range from 0 to 1.5 in some embodiments. In such a case, the overall length 324 may range from 75.0 mm to 1000.0 mm in various embodiments of the present disclosure.

As alluded to earlier herein, the U-shaped body portion 302 may be made from, a white iron material, a carbide material, or have other wear resistant characteristics.

In addition as best seen in FIG. 4, a tip 320 may extend from the top wall 308 but not necessarily so. When present, the tip 320 may be centered on the top wall 308, and may include a sharp point 322, but not necessarily so. The tip 320 may also be manufactured from a wear resistance material or have other wear resistance characteristics same as the U-shaped body portion 302 of the cladding member 300, 300'.

Alternatively as best seen in FIG. 7, the tip 320' may comprise an elongated projection 207' that is integral with the U-shaped body portion 302, yielding a Y-shaped body 226. The elongated projection 207' may define a projection length 326 measured along a direction that is parallel to the overall length 324, and a ratio of the overall length 324 to the projection length 326 may range from 0.5 to 1.0 in various embodiments of the present disclosure.

Again, any of the embodiments discussed herein may be differently configured, dimensioned, or use a different material than has been specifically mentioned herein.

INDUSTRIAL APPLICABILITY

In practice, a track chain assembly, a track shoe assembly, a cladding member, a spike, a tip, or any combination of these components according to any embodiment described herein may be sold, bought, manufactured or otherwise obtained in an OEM (original equipment manufacturer) or after-market context.

Various embodiments of the present disclosure may help to reduce wear and prolong the useful like of a track shoe, track shoe assembly, and a track chain assembly, etc. in abrasive environments such as oil sands and the like.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A cladding member configured to be attached to a grouser of a track shoe, the cladding member comprising:
   a U-shaped body portion including:
      a first side wall,
      a second side wall, and
      a top wall connecting the first side wall to the second side wall and spacing the first side wall away from the second side wall along a direction that is parallel to the top wall a predetermined distance,
         the U-shaped body portion defining an overall height measured along a direction that is perpendicular to the top wall and an overall width that is measured along the direction that is parallel to the top wall, and
         the U-shaped body portion having a hardness that ranges from 55 HRC to 63 HRC; and
   a tip that extends from the top wall,
      the tip including an elongated projection that is integral with the U-shaped body portion, yielding a Y-shaped body,
      a side of the elongated projection facing a same direction as an end of the U-shaped body portion,
      the U-shaped body portion further defining an overall length that is measured along a direction that is perpendicular to the overall height and the overall width, and
      the side of the elongated projection being offset relative to the overall length, on the top wall, and away from the end of the U-shaped body portion.

2. The cladding member of claim 1, wherein the U-shaped body portion comprises one or more of a white iron material or a carbide material.

3. The cladding member of claim 1, wherein:
   a ratio of the overall width to the predetermined distance is greater than 1.0,
   a ratio of the of the overall height to the overall width ranges from 0.5 to 1.5,
   the overall height ranges from 30.0 mm to 50.0 mm,
   the overall width ranges from 40.0 mm to 60.0 mm, and
   the predetermined distance ranges from 30.0 mm to 50.0 mm.

4. The cladding member of claim 1, wherein a ratio of the overall length to the overall height ranges from greater than 0 to 1.5.

5. The cladding member of claim 1, wherein:
   the overall length ranges from 75.0 mm to 1000.0 mm,
   the elongated projection defines a projection length measured along a direction that is parallel to the overall length, and
   wherein the overall length is longer than the projection length.

6. A track shoe assembly comprising:
   a pad portion;
   a grouser extending from the pad portion along a direction that is perpendicular to the pad portion;
   a cap that is attached to the grouser,
      the cap comprising:
         a first side wall,
         a second side wall, and
         a top wall connecting the first side wall to the second side wall and spacing the first side wall away from the second side wall along a direction that is parallel to the top wall, and
      the cap defining:
         an overall height measured along a direction that is perpendicular to the top wall,
         an overall width that is measured along the direction that is parallel to the top wall and
         an overall length that is measured along a direction that is perpendicular to the overall height and the overall width; and
      an elongated projection that extends from the top wall,
         a side of the elongated projection facing a same direction as an end of the cap, and
         the side of the elongated projection being offset relative to the overall length, on the top wall, and away from the end of the cap.

7. The track shoe assembly of claim 6, wherein the cap is bonded or welded to the grouser.

8. The track shoe assembly of claim 6, wherein the grouser also extends from the pad portion along a direction that is parallel to the pad portion, defining a grouser length.

9. The track shoe assembly of claim 6,
   wherein the cap is a first cap,
   wherein the track shoe assembly further comprises:
      a second ca p that is attached to the grouser, and
      a third cap that is attached to the grouser,
   wherein the second cap is spaced away from the first cap a first spacing distance, and
   wherein the third cap is spaced away from the second cap a second spacing distance.

10. The track shoe assembly of claim 8,
    wherein the cap is a first cap, wherein the track shoe assembly further comprises a second cap that is attached to the grouser, wherein the second cap is spaced away from the first cap a first spacing distance, and wherein a ratio of the grouser length to the first spacing distance ranges from 1.0 to 10.0.

11. The track shoe assembly of claim 6, wherein the cap is a first cap, wherein the track shoe assembly further comprises a second cap that is attached to the grouser, wherein the second cap is spaced away from the first cap a first spacing distance, and wherein the first spacing distance ranges from 10.0 mm to 150.0 mm.

12. The track shoe assembly of claim 9, wherein the first spacing distance equals the second spacing distance.

13. The track shoe assembly of claim 8, wherein the first ca p covers at least half of the grouser length.

14. A track chain assembly, comprising:

a plurality of interconnected track links; and a plurality of track shoe assemblies connected to the plurality of interconnected track links, a track shoe assembly, of the plurality of track shoe assemblies, including a grouser;

a wear member portion that is attached to the grouser; and an elongated projection that extends from a top wall of the wear member portion, the wear member portion defining:

an overall height measured along a direction that is perpendicular to the top wall, an overall width that is measured along the direction that is parallel to the top wall and an overall length that is measured along a direction that is perpendicular to the overall height and the overall width, a side of the elongated projection facing a same direction as an end of the wear member portion, and the side of the elongated projection being offset relative to the overall length, on the top wall, and away from the end of the wear member portion.

15. The track chain assembly of claim 14, wherein the wear member portion comprises a wear resistant material.

16. The track chain assembly of claim 15, wherein the wear resistant material is a white iron material or a carbide material.

17. The track chain assembly of claim 14, wherein the wear member portion is bonded or welded to the grouser.

18. The track chain assembly of claim 14, wherein the wear member portion is a U-shaped wear member portion.

19. The track chain assembly of claim 14, wherein the elongated projection is integral with the wear member portion.

20. The track chain assembly of claim 14, wherein the wear member portion is a first wear member portion, wherein the track chain assembly further comprises:

a second wear member portion that is attached to the grouser, and a third wear member portion that is attached to the grouser, and wherein a first distance between the first wear member portion and the second wear member portion is same as a second distance between the second wear member portion and the third wear member portion.

\* \* \* \* \*